H. REISSNER.
COUPLING OF SCREW PROPELLERS, SCREW VENTILATORS, FLY WHEELS, AND OTHER ROTATING MACHINERY.
APPLICATION FILED AUG. 10, 1910.

1,025,589.

Patented May 7, 1912.

Witnesses
Geo. C. Heinitz
H. Kasper

Inventor:
Hans Reissner
By B. Singer
atty.

UNITED STATES PATENT OFFICE.

HANS REISSNER, OF AIX-LA-CHAPELLE, GERMANY.

COUPLING OF SCREW-PROPELLERS, SCREW-VENTILATORS, FLY-WHEELS, AND OTHER ROTATING MACHINERY.

1,025,589. Specification of Letters Patent. Patented May 7, 1912.

Application filed August 10, 1910. Serial No. 576,570.

*To all whom it may concern:*

Be it known that I, HANS REISSNER, doctor engineer and professor in the Royal Polytechnicum at Aix-la-Chapelle, Germany, a subject of the King of Prussia, residing at No. 166 Lütticherstrasse, Aix-la-Chapelle, in the Kingdom of Prussia, Empire of Germany, have invented certain new and useful Improvements in the Coupling of Screw-Propellers, Screw-Ventilators, Fly-Wheels, and other Rotating Machinery; and I do hereby declare the following to be a full, clear, and exact description of the invention, such as will enable others skilled in the art to which it appertains to make and use the same.

My invention relates to coupling means for propellers, screw ventilators, etc., in which a universal joint is used as the connection between the driving and driven parts, and constructed and so disposed thereon to accomplish the following objects, to allow the driven part to swing freely and with little friction on the driving shaft or axle, which permits of a change in the angle between the plane of rotation of the driven part and the axis of the driving shaft. By this construction the bending stress upon the driving shaft, which inevitably arises due to shocks or forces acting upon the propeller or bearings of the driving shaft, are overcome.

Another object is to apply a gyratory motion obtained by the construction of my invention for the automatic stabilization of aeroplanes.

I attain these objects by the construction and arrangement of parts illustrated in the accompanying drawings, in which,—

Figure 1:
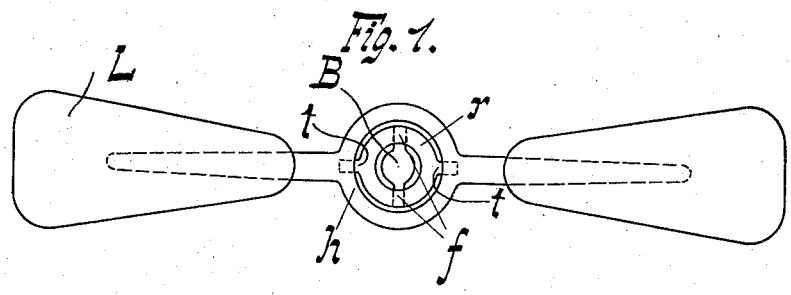
Figure 2:
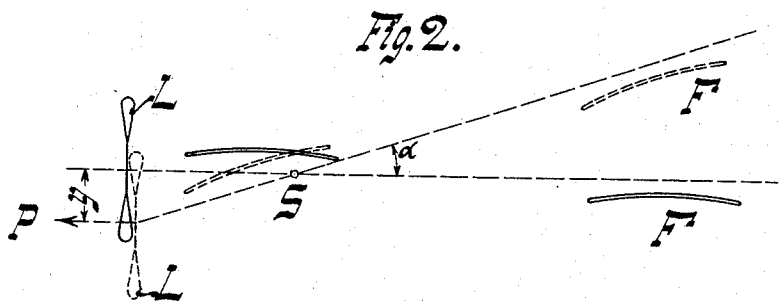
Figure 3:
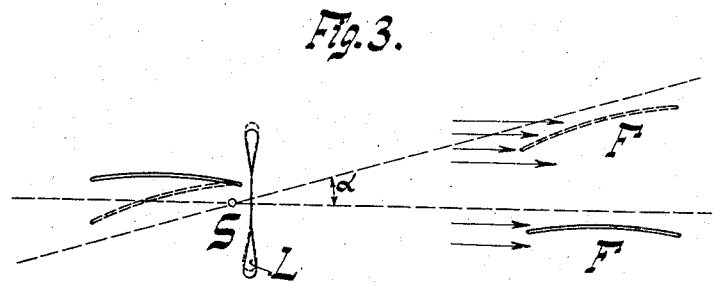

Figure 1 is an elevation of a screw propeller, driving shaft and coupling means, embodying my invention. Figs. 2 and 3 are diagrammatical views showing the application of my invention for the automatic stabilization of aeroplanes.

Similar letters refer to similar parts throughout the several views.

Referring more particularly to Fig. 1 of the drawings, L represents a screw propeller. A ring $h$, the center of which is also the center of gravity of the propeller, forms the portion from which the blades of the propeller project, and has formed in its internal periphery two oppositely disposed bearings. A second ring $r$, pivoted inside the ring $h$, has a pair of oppositely disposed trunnions $t$ which are journaled in the ring $h$. This ring $r$, is pivoted to a driving shaft B by means of oppositely disposed trunnions $f$ formed on the shaft and journaled in bearings located inside the internal periphery of ring $r$. It will be seen from the drawings that the axis of the trunnions $t$ and $f$ intersect at a right angle, and the point of intersection is also the center of gravity of the propeller. By this construction it will be seen that the coupling forms a universal joint between the driving and driven parts, and that the angle of the plane of rotation of the driven part may be changed with respect to the axis of the driving shaft. It has been established that members so coupled will, when rotating, arrange themselves with the plane of rotation of the driven part perpendicular to the axis of the driving shaft and that, should the propeller or driving shaft be thrown out of this relation, by some external force acting upon them, the propeller will aperiodically return to the arrangement before mentioned. Furthermore, this ability of the parts to change their position with relation to each other, partially avoids the bending stress which inevitably occur when the parts are acted upon by an external force.

With reference to Figs. 2 and 3, showing the application of my invention for the stabilization of aeroplanes, in these diagrammatic views, full lines represent the position of the propeller L and planes F, when in a normal or level position, with the lines X—X as the longitudinal axis, and broken lines the position of the propeller, planes and the line Y—Y, the longitudinal axis, in a disturbed position.

S, represents the center of gravity of the aeroplane, and the angle $d$, the change in the normal and disturbed position of the aeroplane with reference to the longitudinal axis. The action of the propeller, as shown in Fig. 2, for the stabilization of the system, is to aperiodically gain its position with the plane of rotation perpendicular with the axis of the driving shaft. By this action the thrust P of the propeller acting through the angle $y$, and with S as the center, tends to return the system to its normal position.

With reference to Fig. 3, the propeller is shown to the rear of the center of gravity, and in which position the reaction of the propeller, acting on the rear planes F, together with a tendency to aperiodically gain its position with the plane of rotation perpendicular with the axis of the driving shaft, returns the system to its normal position.

I claim:—

1. The combination with an aeroplane structure provided with a drive shaft extending longitudinally thereof, of a propeller disposed with its normal plane of rotation perpendicular to said drive shaft to propel the aeroplane in a forward direction, and a universal joint operatively connecting said shaft and propeller, the center of the joint coinciding with the center of gravity of the propeller and having free inclinatory movement with respect to the axis of said drive shaft, serving to allow inclination of the plane of rotation of the propeller, due to forces acting temporarily upon the elements, and automatic locating of the plane of the propeller and axis of the drive shaft perpendicular to each other by means of the gyratory or centrifugal action of the propeller.

2. In combination with an aeroplane structure provided with a drive shaft, of a propeller disposed with its normal plane of rotation perpendicular to said drive shaft, and a universal joint operatively connecting said shaft and propeller, the center of the joint coincident with the center of gravity of said propeller and having free inclinatory movement with respect to the axis of said drive shaft, serving to allow inclination of the plane of rotation of the propeller, due to forces acting temporarily upon the elements, and automatic locating of the plane of the propeller and axis of the drive shaft perpendicular to each other by means of a gyratory or centrifugal action of the propeller.

In testimony whereof I have signed my name to this specification in the presence of two subscribing witnesses.

HANS REISSNER.

Witnesses:
HENRY CUADFLIEG,
ELISE KOELBURCH.